Patented Aug. 16, 1949

2,478,933

UNITED STATES PATENT OFFICE 2,478,933

MANUFACTURE OF 1,1-CHLOROFLUORO-ETHYLENES

Francis H. Bratton, Floral Park, and George M. Weimann, now by change of name George M. Wyman, New York, N. Y., assignors to Allied Chemical & Dye Corporation, a corporation of New York No Drawing. Application April 2, 1947, Serial No. 738,943

12 Claims. (Cl. 260—653)

This invention relates to the manufacture of fluoro olefins, and more particularly to the production of 1,1-chlorofluoroethylenes, which term is intended to include for example $CH_2=CClF$ (vinylidene chlorofluoride) and $CHCl=CClF$.

The present improvements aim to afford procedure for the manufacture of 1,1-chlorofluoroethylenes in a direct and economical manner from certain saturated aliphatic fluorine compounds. More particularly, the invention aims to provide processes for the preparation of vinylidene chlorofluoride, 1,2-dichloro-1-fluoroethylene and 1,1,1-trifluoroethane. The objects and advantages of the invention will appear from the following description.

We have discovered that if certain saturated aliphatic fluorine compounds are subjected to elevated temperature not less than 200° C. and not more than 400° C. in the presence of aluminum oxide, a dehydrohalogenation takes place to produce predominantly a fluorinated olefin such as $CH_2=CClF$.

Briefly, our process is carried into practice in the following manner: A saturated aliphatic fluorine compound such as $CH_3CClF_2$ is passed thru an orifice flowmeter into a reaction tube of suitable heat and corrosion resistant material such as graphite heated to an elevated temperature not less than 200° C. and not more than 400° C. by means of a suitably associated electric furnace. The heated portion of the reactor is packed with alumina. The exit gas of the reactor is passed thru a water scrubber to eliminate any free acid vapors, then thru a calcium chloride drying tower, and the final gas mixture emerging from the drying tower is condensed in a trap cooled with a Dry Ice-acetone mixture to about —78° C. The condensate collected in the trap, comprising essentially $CH_2=CClF$ (B. P. —25.5° C.), some $CH_3CF_3$ (B. P. —46.7° C.) and some unreacted $CH_3CClF_2$ (B. P. —9.6° C.) is then subjected to suitable fractional distillation to recover the individual components.

As starting materials for the process of the invention, we employ saturated halofluoro derivatives of ethane containing at least one hydrogen atom, at least two fluorine atoms, and at least one halogen atom other than fluorine, and having at least one hydrogen atom and at least one fluorine atom on different carbon atoms. These materials usually have two fluorine atoms attached to the same carbon atom, and such materials preferably have two fluorine atoms and one other halogen atom attached to the same carbon atom, and preferably are unsymmetrical with respect to fluorine. Specifically, suitable starting materials are 1,1,1-difluorochloroethane ($CH_3CClF_2$) and 1,1-difluoro-1,2-dichloroethane ($CH_2ClCClF_2$), the former being preferred. These compounds are particularly commercially available and may be obtained in relatively pure form.

The aluminum oxide employed may be obtained from any suitable source, and at the beginning of operations preferably should be substantially pure aluminum oxide such as is commercially available as "activated alumina." However, any reasonably pure aluminum oxide such as good grades of bauxite and certain clays may be used. If desired, an inert carrier or diluent gas such as nitrogen may be used to facilitate movement of reactant into and thru the reaction zone.

Although not essential, in order to increase the efficiency of the process in some instances, it may be desirable in commercial operation to preheat the starting material to a temperature in the vicinity of that of the aluminum oxide in the reactor tube. The vapors of the starting material, whether or not preheated, are then conducted into the heated reactor tube preferably of considerable length as compared to its diameter. Within this tube is a section of aluminum oxide in granular or pellet form packed so as to permit sufficient free space to allow passage of the gas thru the tube at a good rate of flow. In practice of the invention, rate of feed of incoming gas into the reaction zone may be any suitable value, depending upon the conditions at hand, such as to afford reaction time sufficient to facilitate good commercial recoveries of products.

As the vapors of the $CH_3CClF_2$ starting material pass thru the reaction zone, vinylidene chlorofluoride is produced, evidently in accordance with reactions of the order of the following:

1. 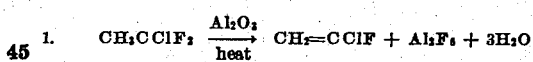

and

2. 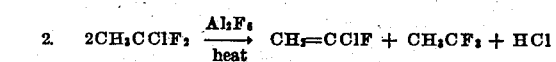

the $Al_2F_6$ being used to denote a complex basic aluminum fluoride.

The overall reaction is exothermic and at certain space velocities and feed gas temperatures, the reaction may be almost self-sustaining. The major product formed is $CH_2=CClF$, as noted by reaction 1. The largest molar ratio of $CH_2=CClF$ to $CH_3CF_3$ is produced at the commencement of the reaction when the aluminum oxide reagent is substantially pure and very little of the basic $Al_2F_6$ or $AlF_3$ has been formed. As the reaction proceeds, more of the aluminum oxide is transformed into the basic aluminum fluoride, and the fluorine content of such fluoride increases. The present invention is directed primarily to manufacture of vinylidene chlorofluoride. Accordingly, preferably before the aluminous material in the reactor contains more than 48% by weight of fluorine, such reactor is disconnected, and the incoming raw material gas stream is run into a second thermal reactor containing fresh aluminum oxide and connected in parallel with the first mentioned reactor. On the basis of $CH_2=CClF$ yield desired, change-over to fresh aluminum oxide may be made substantially sooner than the point indicated and may be made as frequently as circumstances require. Alternatively, the reaction may be carried out by countercurrent contact of incoming starting material gas and a downflow of relatively finely divided aluminum oxide reagent, in which instance the latter may be recirculated thru the reaction zone until the indicated preferred maximum aluminum fluoride content is reached. The aluminum oxide material in the circulation system may then be replaced by fresh aluminum oxide.

As indicated, the overall reaction takes place at a temperature not less than 200° C. and not more than 400° C. We prefer to operate, however, at a temperature not less than 250° C. and not more than 350° C., and for best commercial operation, a temperature of reaction in the vicinity of 300° C. has been found most desirable. Although we prefer to carry out the reaction at substantially atmospheric pressure, the reaction may alternatively be carried out at either subatmospheric or superatmospheric pressure.

The major components of the reaction mixture leaving the dehydrofluorination reaction zone may be recovered in any suitable manner such as the following: The exit gases from the reactor tube may be conducted into a water scrubber which functions to condense most of the water and to dissolve practically all of the HCl and any traces of HF contained in the reactor exit gas. The cooled and de-acidified reaction mixture is then passed thru a drying tower containing a suitable drying material such as calcium chloride, the drying tower being of sufficient capacity to remove substantially all of the moisture from the incoming gases. From the drying tower the de-humidified gas mixture is condensed in a trap maintained at about —78° C. by a Dry Ice-acetone mixture. A small amount of non-condensible gases, which may contain some $CH_2=CF_2$ (B. P. —83° C.) may be turned to waste.

In the case where $CH_3CClF_2$ is the starting material, the condensate mixture in the trap contains principally $CH_2=CClF$, some $CH_3CF_3$ and some unreacted $CH_3CClF_2$. The individual components are then separated by fractional distillation. $CH_3CF_3$, the most volatile of these components, is collected in a first cut at its boiling point of —46.7° C.; $CH_2=CClF$ is recovered next at its boiling point of —25.5° C.; and unreacted $CH_3CClF_2$ is recovered in the last cut at its boiling point of —9.6° C. Each of the respective components may be individually redistilled to obtain a purer product if desired. Distillation may be carried out in any suitable manner, batch-wise or continuously, and under atmospheric or superatmospheric pressure.

When $CH_2ClCClF_2$ is used as raw material, general operation of the process is as already described. Major reactions taking place appear to be of the order of the following:

3. $CH_2ClCClF_2 \xrightarrow[\text{heat}]{Al_2O_3} CHCl=CClF + Al_2F_6 + H_2O$

the $Al_2F_6$ being used to denote a complex basic aluminum fluoride. Yield of $CHCl=CClF$ is about as indicated in Equation 3 at the outset of reaction when the aluminum oxide is fresh. However, as the quantity of $Al_2F_6$ increases, production of $CHCl=CClF$ drops off and the amount of unreacted $CH_2ClCClF_2$ exiting the reaction zone increases. Hence, as in the principal embodiment of the invention, frequent replacement of aluminum oxide is desirable.

In practice of the modification under consideration, the exit gas of the reaction zone may be passed into a water scrubber which dissolves acid constituents of the gas stream. The $CHCl=CClF$ product has a boiling point of 35.1° C., and hence most of the product passes thru the water scrubber, because of the fairly high temperature caused by acid dissolution. The off-gas of the scrubber, after drying, may be refrigerated sufficiently to condense $CHCl=CClF$ and any unreacted $CH_2ClCClF_2$ (B. P. 46.8° C.). The condensate may be fractionated to recover these materials separately, and any $CH_2ClCClF_2$ obtained may be recycled.

The following examples serve to illustrate the practice of our invention, quantities of reactants and products being expressed in terms of parts by weight:

Example 1.—A feed gas containing 200 parts of $CH_3CClF_2$ was passed thru an orifice flowmeter and into a reactor tube, heated to temperatures in the range of 290° to 320° C. and initially containing 90 parts of fresh 4–8 mesh activated alumina, at a rate of 25 liters per hour. The reactor tube exit gases were passed thru a water scrubber to remove HCl and any traces of HF, thence thru a calcium chloride drying tower, and were finally condensed in a trap which was cooled by Dry Ice to about —78° C. The condensate collected in the trap was subjected to fractional distillation during which 5 parts of $CH_3CF_3$ were collected first within a boiling range of —47° to —45.5° C., 85 parts of $CH_2=CClF$ were recovered next within a boiling range of —26° to —24.5° C., and 55 parts of unreacted $CH_3CClF_2$ were collected last within a boiling range of —10.5° to —9.2° C. 53% of the $CH_3CClF_2$ introduced was converted to the desired $CH_2=CClF$.

Example 2.—A feed gas containing 300 parts of $CH_3CClF_2$ was passed thru an orifice flowmeter and into a reactor tube, initially containing 30 parts of fresh 8–14 mesh activated alumina maintained at 280–310° C., at a rate of 80 parts per hour. The reaction mixture exit gases were passed thru a water scrubber and a calcium chloride drying tower, and were then condensed in a trap cooled by a mixture of Dry Ice and acetone to a temperature of —78° C. 225 parts of condensate were thus collected in the Dry Ice trap, and this condensate was then subjected to fractional distillation wherein 5 to 10 parts of $CH_3CF_3$ were first recovered, 95 parts of $CH_2=CClF$ were next collected, and 100 parts of unreacted $CH_3CClF_2$ were recovered last. 40% of the $CH_3CClF_2$ introduced was converted to $$CH_2=CClF$$

*Example 3.*—A feed gas containing 417 parts of $CH_3CClF_2$ was passed thru an orifice flowmeter and into and thru a reactor tube initially containing 193 parts of 8–14 mesh alumina having an $Al_2O_3$ content of 85.7%. Average temperature in the reactor was about 300° C. and maximum temperature was about 350° C. The reaction mixture exit gases were conducted thru a water scrubber to remove acid components, a calcium chloride drying tower and were then condensed in a trap, cooled with a Dry Ice-acetone mixture to −78° C. A small amount of non-condensible gas escaped. The condensate in the trap was then fractionally distilled, yielding in a first cut 21 parts of $CH_3CF_3$, 240 parts of $CH_2=CClF$ in a second cut, and 40 parts of unreacted $CH_3CClF_2$ in a third cut. 72% of the $CH_3CClF_2$ introduced was converted to $$CH_2=CClF$$

*Example 4.*—A preheated feed gas containing 118 parts of $CH_2ClCClF_2$ (boiling point 46.8° C.) was carried by means of a stream of nitrogen thru an orifice flowmeter and into a reactor tube heated to 300° C. and initially containing a bed of fresh 8–14 mesh activated alumina. The reaction mixture exit gases were conducted thru a water scrubber, a calcium chloride drying tower, and were then condensed in a trap cooled with a Dry Ice-acetone mixture to −78° C. 100 parts of condensate containing $CHCl=CClF$ were collected in the Dry Ice trap.

In all of the above examples, the aluminum oxide reagent contained substantially less than 48% by weight of fluorine at the end of the respective runs.

Uses of the chlorofluoroethylenes produced by the process of our invention are as chemical intermediates and as monomers for employment in polymerization reactions to produce polymers, the most important applications of which are as a constituent of coating compositions, as a plasticizer for other polymers, and as an adhesive. The $CH_3CF_3$ by-product of our process may be employed as a refrigerant, a low temperature solvent, and a diluent for reactions conducted at low temperature.

We claim:

1. The process for making $CH_2=CClF$ which comprises heating $CH_3CClF_2$ to a temperature not less than 200° C. and not more than 400° C. in the presence of aluminum oxide, and recovering $CH_2=CClF$ from the resulting reaction mixture.

2. The process for making $CH_2=CClF$ which comprises heating $CH_3CClF_2$ to a temperature not less than 250° C. and not more than 350° C. in the presence of an aluminum oxide reagent of the group consisting of aluminum oxide, a complex basic aluminum fluoride and mixtures thereof, said reagent containing not more than 48% by weight of fluorine, and recovering $CH_2=CClF$ from the resulting reaction mixture.

3. The process for making $CHCl=CClF$ which comprises heating $CH_2ClCClF_2$ to a temperature not less than 200° C. and not more than 400° C. in the presence of aluminum oxide, and recovering $CHCl=CClF$ from the resulting reaction mixture.

4. The process for making $CHCl=CClF$ which comprises heating $CH_2ClCClF_2$ to a temperature not less than 250° C. and not more than 350° C. in the presence of an aluminum oxide reagent of the group consisting of aluminum oxide, a complex basic aluminum fluoride and mixtures thereof, said reagent containing not more than 48% by weight of fluorine, and recovering $CHCl=CClF$ from the resulting reaction mixture.

5. The process which comprises subjecting a compound selected from the group consisting of $CH_3CClF_2$ and $CH_2ClCClF_2$ to a temperature not less than 200° C. and not more than 400° C. in the presence of aluminum oxide.

6. The process for making a 1,1-chlorofluoroethylene which comprises heating a compound selected from the group consisting of $CH_3CClF_2$ and $CH_2ClCClF_2$ to a temperature not less than 200° C. and not more than 400° C. in the presence of aluminum oxide, and recovering a 1,1-chlorofluoroethylene from the resulting reaction mixture.

7. The process for making a 1,1-chlorofluoroethylene which comprises heating a compound selected from the group consisting of $CH_3CClF_2$ and $CH_2ClCClF_2$ to a temperature not less than 200° C. and not more than 400° C. in the presence of an aluminum oxide reagent of the group consisting of aluminum oxide, a complex basic aluminum fluoride and mixtures thereof, said reagent containing not more than 48% by weight of fluorine, and recovering a 1,1-chlorofluoroethylene from the resulting reaction mixture.

8. The process which comprises heating a compound selected from the group consisting of $CH_3CClF_2$ and $CH_2ClCClF_2$ to a temperature not less than 250° C. and not more than 350° C. in the presence of aluminum oxide.

9. The process for making a 1,1-chlorofluoroethylene which comprises heating a compound selected from the group consisting of $CH_3CClF_2$ and $CH_2ClCClF_2$ to a temperature not less than 250° C. and not more than 350° C. in the presence of an aluminum oxide reagent of the group consisting of aluminum oxide, a complex basic aluminum fluoride and mixtures thereof, said reagent containing not more than 48% by weight of fluorine, and recovering a 1,1-chlorofluoroethylene from the resulting reaction mixture.

10. The process for making a 1,1-chlorofluoroethylene which comprises passing a stream of a gaseous compound selected from the group consisting of $CH_3CClF_2$ and $CH_2ClCClF_2$ into a reaction zone containing an aluminum oxide reagent which initially contains substantially no fluorine compound, maintaining said zone at temperature not less than 200° C. and not more than 400° C., whereby there is formed a reaction zone exit gas containing a 1,1-chlorofluoroethylene, recovering a 1,1-chlorofluoroethylene from said exit gas, and ceasing introduction of said gaseous compound into said reaction zone before the fluorine content of said reagent is more than 48% by weight.

11. The process which comprises passing a stream of gaseous $CH_3CClF_2$ into a reaction zone containing an aluminum oxide reagent which initially contains substantially no fluorine, maintaining said zone at temperature not less than 200° C. and not more than 400° C., whereby there is formed a reaction zone exit gas containing $CH_2=CClF$ and some $CH_3CF_3$, recovering $CH_2=CClF$ from said exit gas, and ceasing introduction of $CH_3CClF_2$ into said reaction zone before the fluorine content of said reagent is more than 48% by weight.

12. The process which comprises subjecting a compound selected from the group consisting of $CH_3CClF_2$ and $CH_2ClCClF_2$ to temperature not less than 200° C. and not more than 400° C. in the presence of an aluminum oxide reagent of the group consisting of aluminum oxide, a complex basic aluminum fluoride and mixtures thereof, said reagent containing not more than 48% by weight of fluorine.

FRANCIS H. BRATTON.
GEORGE M. WEIMANN.

REFERENCES CITED

The following references are of record in the file of this patent:

UNITED STATES PATENTS

| Number | Name | Date |
|---|---|---|
| 1,994,035 | Croco | Mar. 12, 1934 |

OTHER REFERENCES

Torkington et al.: Trans. Faraday Soc., vol. 41, 236–7 (1945).